March 27, 1934.  M. E. MITCHELL  1,952,451
SWIVEL CHUCK
Filed Sept. 7, 1932

INVENTOR.
Malcolm E. Mitchell
BY
ATTORNEYS.

Patented Mar. 27, 1934

1,952,451

UNITED STATES PATENT OFFICE 1,952,451

SWIVEL CHUCK

Malcolm E. Mitchell, Oakland, Calif.

Application September 7, 1932, Serial No. 631,978

2 Claims. (Cl. 285—122)

The invention relates to a swivel chuck such as used for effecting attachment between an air hose and the valve-fitting arranged to be applied to the inlet stem of a pneumatic tire, the attachment between the fitting and hose being almost necessarily of a nature permitting relative rotation of one with respect to the other so that the proper application of the fitting may be made notwithstanding any inconvenient or awkward positioning of the stem.

An object of the invention is to provide a device of the character described in which the air seal will be effected and maintained constant entirely independent of the air pressure in the line and may be varied as to its degree of positiveness at will.

Another object of the invention is to provide a device of the character described in which the effectiveness of the air seal will to a large measure be independent of the expansive nature of packing element utilized therein.

A further object of the invention is to provide a device of the character described which will permit the disconnection of the valve-fitting from the hose without disrupting the desired relationship of the parts for effecting the reconnection of said members.

A still further object of the invention is to provide a device of the character described which upon the disconnection of the members as aforesaid, will expose the packing element for inspection or permit replacement thereof without disturbing any of the other parts of the device.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
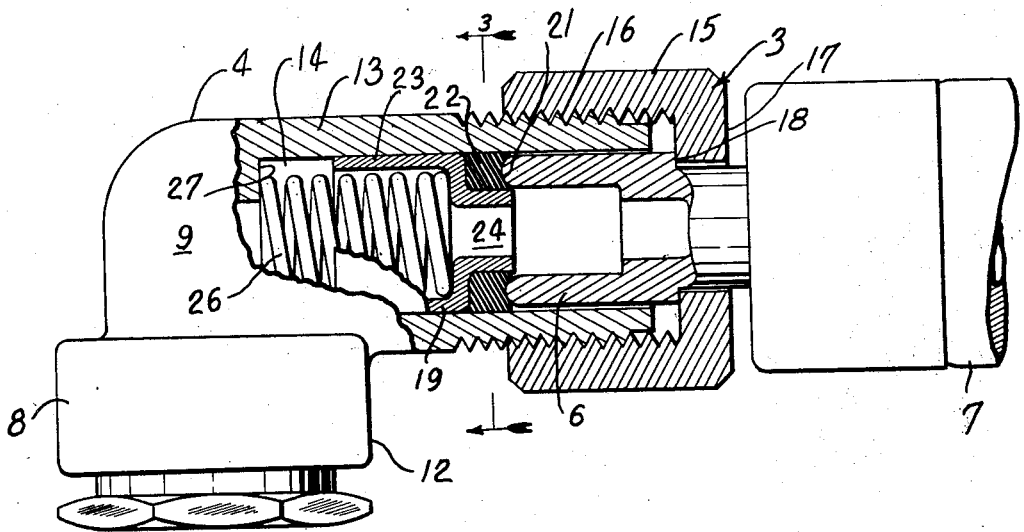
Figure 1 is a longitudinal sectional view, partly in elevation, of the device of my invention operatively connecting the hose with the valve-fitting.
Figure 2:
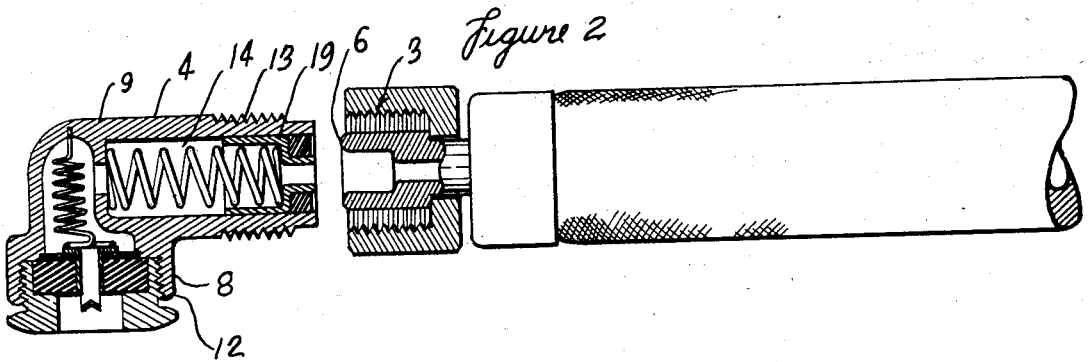
Figure 2 is a view similar to Figure 1, but on a smaller scale and with the members in detached relation.
Figure 3:
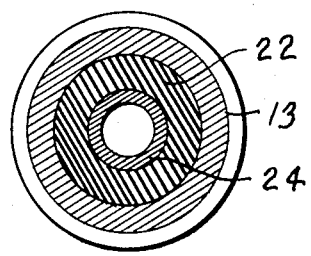
Figure 3 is a transverse sectional view of the device taken on the line 3—3 of Figure 1.

In the embodiment of my invention here illustrated, the chuck is formed in what may be conveniently considered two sections 3 and 4, the section 3 being combined with the outlet stem 6 of an air hose 7 such as used in automobile service stations, while the section 4 is incorporated as a part of a valve-fitting 8 which is arranged to be applied to the usual inlet stem of a pneumatic tire to effect introduction of air to the tire.

The fitting 8 and section 4, as here shown, have a common body 9 provided with angularly related portions 12 and 13 respectively housing the parts of the fitting and section 4. Within the body portion 13 is formed a longitudinally extending bore 14 arranged for the passage of air and into which the hollow stem 6 associated with section 3 is arranged to loosely extend. Attachment of the two sections is preferably afforded by means of an interiorly threaded hollow nut 15 designed to engage the external threads 16 at the free end of the body portion 13. The nut 15 is mounted to rotate on the stem 6 but is held against outward longitudinal displacement thereon by means of an annular flange 17 formed on the nut and engageable with a shoulder 18 of the stem.

Arranged within the body portion 13 is a slidable unit comprising a tubular member 19 and an annular packing element 22, the latter being preferably carried by the member and so positioned as to be engageable directly by the outer rim 21 of the stem 6 when the sections are drawn together. The member 19, as will be clear, forms a carrier for the element 22 and is provided with an enlarged portion 23 which slidably fits against the walls of bore 14, and a reduced portion 24 around which the element 22 extends. The element 22 is preferably formed of leather or similar material and its outer circumference is such that it will, particularly when compressed axially, firmly engage the bore walls aforesaid.

Sealing of the air line when the sections are connected together is arranged to be effected by retaining the annular rim 21 of stem 6 pressed against the adjacent side of the packing element 22 whereby the air will be prevented from escaping not only between the element and stem but between the element and the walls of bore 14. As here shown, retention of the element against the stem is afforded by means of a coil spring 26 interposed between a shoulder 27 in the body 9 and the slide member 19, the spring being preferably seated within the member so that the latter may provide a guide for the spring and at the same time permit a greater length of spring without sacrificing the length of bearing of the member.

The rim 21 is preferably formed with a rounded or convex face, and when the sections are secured together such as by screwing the nut 15 over the threaded body portion 13, the rim will, with a pressure in proportion to the force exerted by the spring 26, engage the packing element along the entire annular side thereof and thereby cause the element to be backed against the enlarged portion 23 of member 19 and expanded radially into sealing fit with the walls of the bore and the sides of the member portion 24. Thus a seal is effected on all four sides of the element and no air can escape between stem and body to discharge between the body and nut or between the nut and stem. While, as noted, a most effective air seal is afforded with the parts positioned as described, relative rotation of the stem and packing element may be readily had without in any way affecting the efficiency of the seal, the desired engagement of the stem and element being maintained and at the same time the comparatively easy sliding movement of the face of the stem over the surface of the element being permitted by reason of the resilient engagement between said parts. Variation in the degree of pressure exerted between the element and stem may be accomplished by screwing the nut on the body to a greater or lesser extent. However, under ordinary circumstances it is desirable to screw the nut home so that a substantial locking of the parts in position will be effected.

A feature in the design of the device as described, is that not only may the ready attachment or detachment of the sections be accomplished, but the parts comprising the separate sections will remain unitarily held in the associated section in the detached as well as attached position of the device. Furthermore, since the packing element is fully exposed and accessible when the sections are detached, the ready inspection and replacement of the element may be easily effected.

I claim:

1. A swivel chuck of the character described, comprising a section with a body having a passage therethrough, a hollow member slidably fitting in said passage and having a reduced portion adjacent one end defining a transverse wall, a second section with a stem having a passage therethrough and an annular end face, an expansible packing ring carried about said reduced portion and against one side of said wall for engagement with said face and with its periphery engaging the walls of said body passage, means arranged to screw-threadedly connect said sections and hold them for relative rotation, and a spring positioned in said body passage and seated within said hollow member and bearing against the other side of said first wall for forcing said member outwardly and effect resilient and sealed engagement between said face and packing with the latter being expanded to form a seal with the wall portions of said body engaged therewith.

2. A swivel chuck comprising, a body member defining a tubular stem provided circumferentially therearound with an annular flange, a nut rotatably mounted on said stem and engaging and held against endwise displacement by said flange and provided with a threaded inner wall surrounding and spaced from the periphery of said stem, a second body member having a passage opening to an end thereof arranged to telescope said stem and formed inwardly of said end with a reduced portion defining an annular wall and provided with a threaded periphery for engaging the threaded inner wall of said nut whereby on rotation of the latter relative axial movement of the members may be effected, a tubular member slidably mounted in said passage between said wall and end and provided adjacent the outer end thereof with a reduced portion in axial alignment with said stem and defining with said passage an annular recess, a packing ring seated in said recess and engaging the end of said stem, and a helical spring mounted in said passage with an end thereof engaging said annular wall and the other end seated within said tubular member and engaging the reduced portion thereof for urging said tubular member into sealing engagement with said packing ring and stem.

MALCOLM E. MITCHELL.